(12) United States Patent
Motokawa (10) Patent No.: US 12,463,300 B2
(45) Date of Patent: Nov. 4, 2025

(54) ELECTRICITY STORAGE DEVICE AND ELECTRICITY STORAGE MODULE (71) Applicant: Panasonic Intellectual Property Management Co., Ltd., Osaka (JP)

(72) Inventor: Shinya Motokawa, Hyogo (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 503 days.

(21) Appl. No.: 17/268,902

(22) PCT Filed: Sep. 17, 2019

(86) PCT No.: PCT/JP2019/036273
§ 371 (c)(1),
(2) Date: Feb. 16, 2021

(87) PCT Pub. No.: WO2020/066729
PCT Pub. Date: Apr. 2, 2020

(65) Prior Publication Data
US 2021/0328310 A1 Oct. 21, 2021

(30) Foreign Application Priority Data

Sep. 28, 2018 (JP) .................................. 2018-185787

(51) Int. Cl.
H01M 50/54 (2021.01)
H01M 10/0585 (2010.01)
(Continued)

(52) U.S. Cl.
CPC ....... *H01M 50/54* (2021.01); *H01M 10/0585* (2013.01); *H01M 50/209* (2021.01);
(Continued)

(58) Field of Classification Search
CPC .. H01M 50/54; H01M 50/209; H01M 50/531; H01M 50/533; H01M 50/55;
(Continued)

(56) References Cited

U.S. PATENT DOCUMENTS

2011/0236750 A1* 9/2011 Kohno ................ H01M 50/474
429/181
2012/0003512 A1* 1/2012 Kohno .............. H01M 10/0587
429/179
(Continued)

FOREIGN PATENT DOCUMENTS

EP 2575190 A2 4/2013
JP S37-016350 7/1962
(Continued)

OTHER PUBLICATIONS

English Translation of JP2016004633A; Power Storage Element; GS Yuasa Corp; Jan. 12, 2016 (Year: 2016).*
(Continued)

*Primary Examiner* — Adam J Francis
(74) *Attorney, Agent, or Firm* — Rimon P.C.

(57) ABSTRACT

Electricity storage device includes: outer can having opening; electrode body housed in outer can; sealing plate that closes opening; a pair of output terminals arranged on sealing plate; current collector by which electrode body are electrically connected to the pair of output terminals and electrode body holder that is housed in outer can, includes flat plate extending in a direction intersecting a direction in which each of electrode body and sealing plate are arranged, and is fixed to sealing plate to suppress displacement of electrode body, electrode body holder having an insulating property.

9 Claims, 9 Drawing Sheets (51) Int. Cl.
  *H01M 50/176* (2021.01)
  *H01M 50/209* (2021.01)
  *H01M 50/264* (2021.01)
  *H01M 50/293* (2021.01)
  *H01M 50/474* (2021.01)
  *H01M 50/531* (2021.01)
  *H01M 50/533* (2021.01)
  *H01M 50/55* (2021.01)
  *H01M 50/553* (2021.01)
  *H01M 50/557* (2021.01)
  *H01M 50/586* (2021.01)
  *H01M 50/59* (2021.01)

(52) U.S. Cl.
  CPC ....... *H01M 50/531* (2021.01); *H01M 50/533* (2021.01); *H01M 50/55* (2021.01); *H01M 50/553* (2021.01); *H01M 50/557* (2021.01); *H01M 50/586* (2021.01); *H01M 50/59* (2021.01); *H01M 50/176* (2021.01); *H01M 50/264* (2021.01); *H01M 50/293* (2021.01); *H01M 50/474* (2021.01)

(58) Field of Classification Search
  CPC ............. H01M 50/553; H01M 50/557; H01M 50/586; H01M 50/59; H01M 50/176; H01M 50/264; H01M 50/293; H01M 50/474; H01M 50/477; H01M 10/0585
  See application file for complete search history.

(56) References Cited

U.S. PATENT DOCUMENTS

| | | | | |
|---|---|---|---|---|
| 2013/0078505 | A1* | 3/2013 | Kim | H01M 10/0431 429/179 |
| 2013/0108916 | A1* | 5/2013 | Song | H01M 50/553 429/179 |
| 2013/0209859 | A1* | 8/2013 | Tsuruta | H01R 43/16 429/142 |
| 2016/0072104 | A1* | 3/2016 | Yamafuku | H01M 50/1245 429/153 |
| 2017/0155097 | A1* | 6/2017 | Kang | H01M 50/147 |
| 2018/0261849 | A1 | 9/2018 | Kawate et al. | |
| 2020/0395579 | A1* | 12/2020 | Ichinohashi | H01G 11/22 |

FOREIGN PATENT DOCUMENTS

| | | |
|---|---|---|
| JP | 2004-014173 A | 1/2004 |
| JP | 2006-066319 A | 3/2006 |
| JP | 2011-049064 A | 3/2011 |
| JP | 2013-073936 A | 4/2013 |
| JP | 2016-004633 A | 1/2016 |

OTHER PUBLICATIONS

English Translation of Chinese Office Action dated Sep. 28, 2022 for the related Chinese Patent Application No. 201980059999.8.
International Search Report issued in corresponding International Patent Application No. PCT/JP2019/036273, dated Dec. 17, 2019, with English translation.
English Translation of Chinese Search Report dated Mar. 23, 2023 for the related Chinese Patent Application No. 201980059999.8.

* cited by examiner

ately is electricity storage devices and electricity storage modules.

ELECTRICITY STORAGE DEVICE AND ELECTRICITY STORAGE MODULE

CROSS-REFERENCE OF RELATED APPLICATIONS

This application is a U.S. National Stage Application of the International Application No. PCT/JP2019/036273 filed on Sep. 17, 2019, which claims the benefit of foreign priority of Japanese Patent Application No. 2018-185787 filed on Sep. 28, 2018, the contents all of which are incorporated herein by reference.

TECHNICAL FIELD

The present invention relates to electricity storage devices and electricity storage modules.

BACKGROUND ART

One known example of power sources, such as those for vehicles, that require high output voltages is electricity storage modules that have an assembly in which a plurality of electricity storage devices (e.g., batteries) are connected together in series. Electricity storage devices used for such electricity storage modules typically each include: an outer can having an opening; electrode bodies housed in the outer can; a sealing plate that closes an opening of the outer can; a pair of output terminals provided on the sealing plate; and collector tabs by which the electrode bodies are electrically connected to the pair of output terminals (e.g., see PTL 1).

CITATION LIST

Patent Literature

PTL 1: Unexamined Japanese Patent Publication No. 2011-49064

SUMMARY OF THE INVENTION

In recent years, there has been a demand for electricity storage modules to have further higher capacities. To satisfy this demand, the capacities of electricity storage devices have been increased. A typical electricity storage device tends to expand with use. The expansion of an electricity storage device is mainly due to the expansion of the electrode bodies. As the capacity of an electricity storage device increases, the expansion amount of the electricity storage device may increase. The expansion amount of the electricity storage device may significantly increase, especially at its end of life (EOL). When an electricity storage device expands, the inner volume of this electricity storage device increases. When the inner volume of the electricity storage device increases, the water level of the electrolytic solution is lowered to decrease the contact area between each electrode body and the electrolytic solution. This may cause some disadvantages, such as a decreased capacity and increased internal resistance of the electricity storage device. Furthermore, when the expansion amount of the electricity storage device excessively increases, the connection between the outer can and the sealing plate may be damaged. In short, the expansion of an electricity storage device can lead to lowered reliability of this electricity storage device and thus the electricity storage module.

An object of the present invention, which has been made in view of the above situation, is to provide a technique for enhancing reliability of an electricity storage device and an electricity storage module.

One aspect of the present invention is an electricity storage device. This electricity storage device includes: an outer can having an opening; electrode body housed in the outer can; a sealing plate that closes the opening; a pair of output terminals arranged on the sealing plate; current collector by which the electrode body are electrically connected to the pair of output terminals; and an electrode body holder that is housed in the outer can, includes a flat plate extending in a direction intersecting a direction from the electrode body toward the sealing plate, and is fixed to the sealing plate to suppress displacement of the electrode body, the electrode body holder having an insulating property.

Another aspect of the present invention is an electricity storage module. This electricity storage module includes an assembly of a plurality of the electricity storage devices of the above aspect.

Combinations of any of the above components and conversions of expressions of the present invention between methods, devices, systems, and other similar entities are still effective as aspects of the present invention.

The present invention makes it possible to enhance reliability of an electricity storage device and an electricity storage module.

DESCRIPTION OF EMBODIMENTS

With reference to the accompanying drawings, the present invention will be described below based on some preferred exemplary embodiments. It should be noted that those exemplary embodiments are examples and thus not intended to limit the invention. Not all features described in the embodiments and all combinations of these features are essential to the invention. Identical reference marks are assigned to the same or equivalent components, members, and processes illustrated in the drawings. Descriptions of the same or equivalent components and members will be skipped as appropriate. The scales and shapes of parts illustrated in individual drawings are determined for convenience in order to facilitate explanation and thus should not be interpreted in a limited manner unless otherwise specified. Terms "first" and "second" and other ordinal numbers used in the specification or claims are not intended to represent any sequence or important degree unless otherwise specified but to distinguish a certain component from others. The drawings do not illustrate some members if they are not important in explaining the exemplary embodiments.

Figure 1:
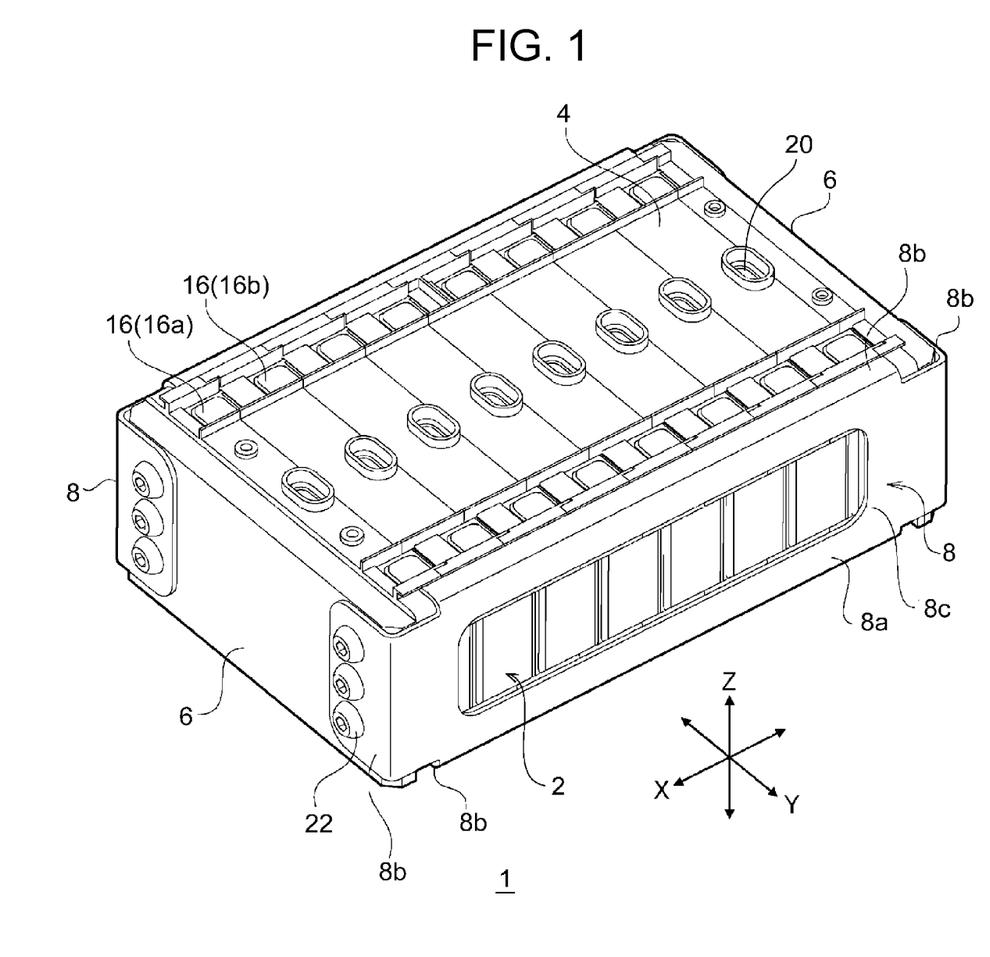
FIG. 1 is a perspective view of an electricity storage module according to a first exemplary embodiment.
Figure 2:
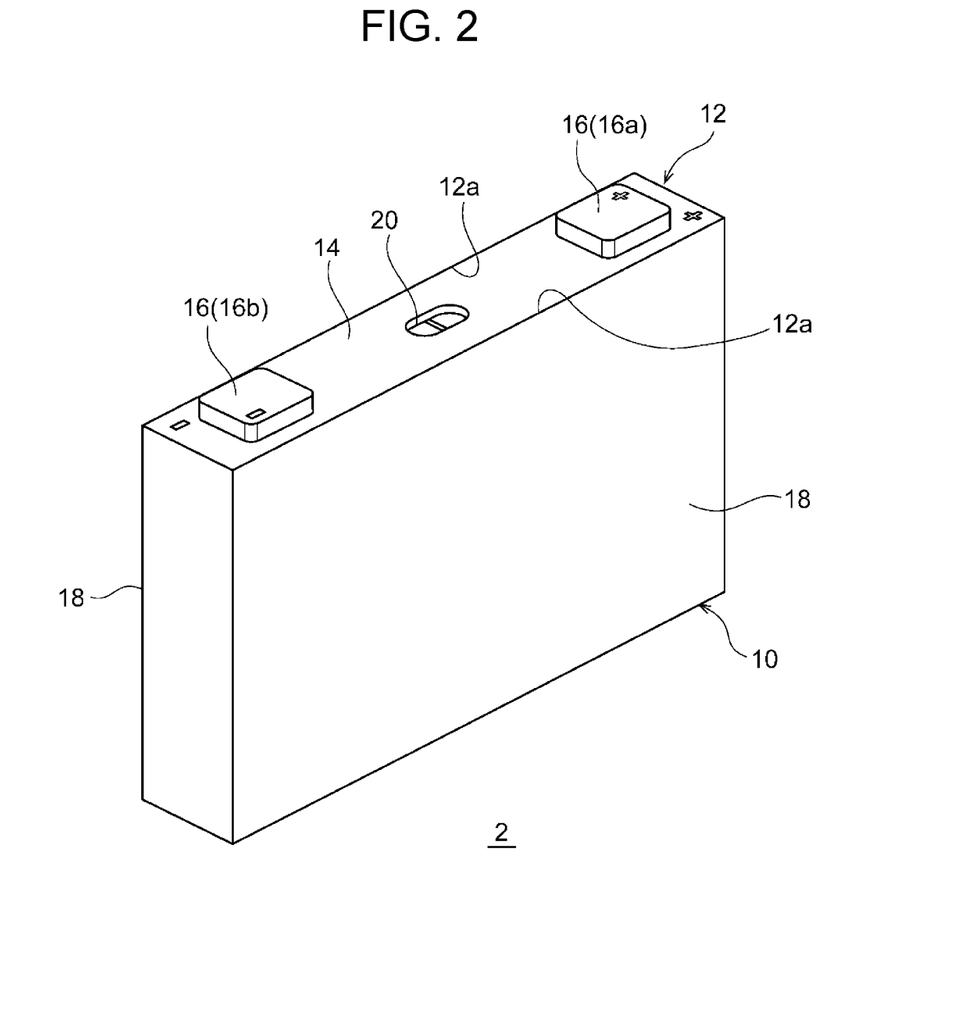
FIG. 2 is a perspective view of an electricity storage device according to the first exemplary embodiment.

FIG. 1 is a perspective view of an electricity storage module according to a first exemplary embodiment. FIG. 2 is a perspective view of an electricity storage device according to the first exemplary embodiment. Electricity storage module 1 includes a plurality of electricity storage devices 2, a plurality of separators 4, a pair of end plates 6, and a pair of restraint members 8.

Each of electricity storage devices 2 may be a rechargeable secondary battery, such as a lithium ion battery, a nickel-hydrogen battery, or a nickel-cadmium battery. Each of electricity storage devices 2, which may be a so-called square battery, includes outer can 10 with a flat rectangular parallelepiped shape. Outer can 10 has a surface provided with opening 12 having a rectangular shape and accommodates electrode body 24 (see FIG. 3), an electrolytic solution, and other members through opening 12. Provided over opening 12 is sealing plate 14, which closes opening 12 to seal outer can 10. Sealing plate 14 may be a rectangular plate, for example.

Sealing plate 14 has output terminal 16 of a positive electrode near one end in a longitudinal direction and also has output terminal 16 of a negative electrode near the other end. Hereinafter, as appropriate, output terminal 16 of the positive electrode will be referred to as positive electrode terminal 16a, whereas output terminal 16 of the negative electrode will be referred to as negative electrode terminal 16b. When it is not necessary to distinguish the polarities of output terminals 16 from each other, positive electrode terminal 16a and negative electrode terminal 16b are collectively referred to as output terminals 16. Outer can 10 and sealing plate 14 may be a conductive material, such as a metal. For example, each of outer can 10 and sealing plate 14 may be made of aluminum, iron, or stainless steel. Sealing plate 14 may be welded to a portion of outer can 10 around opening 12 with laser, for example.

In the description of this exemplary embodiment, for convenience, a surface of each electricity storage device 2 on which sealing plate 14 is provided is defined as an upper surface, whereas the opposite surface of each electricity storage device 2 is defined as the bottom surface. Each electricity storage device 2 further includes four side surfaces that connect the upper surface to the bottom surface. Out of the four side surfaces, two are a pair of long-side surfaces 18, which are connected to two long sides 12a of opening 12 which face each other. Long-side surfaces 18 are ones of the six surfaces of electricity storage device 2 which have the largest area, that is, main surfaces. Aside from two long-side surfaces 18, the two remaining side surfaces are a pair of short-side surfaces connected to the short sides of the upper and bottom surfaces of each electricity storage device 2.

For convenience of explanation, a surface of electricity storage module 1 which corresponds to the upper surfaces of electricity storage devices 2 is defined as an upper surface of electricity storage module 1; a surface of electricity storage module 1 which corresponds to the bottom surfaces of electricity storage devices 2 is defined as a bottom surface of electricity storage module 1; and the surfaces of electricity storage module 1 which correspond to the short-side surfaces of electricity storage devices 2 are each defined as a side surface of electricity storage module 1. The upper surface side of electricity storage module 1 is defined as an upper side in a vertical direction, whereas the bottom surface side of electricity storage module 1 is defined as a lower side in the vertical direction. Those directions and positions are defined simply for convenience. Thus, for example, this definition does not mean that a part defined as the upper surface in the present invention is always positioned higher than a part defined as the bottom surface.

Sealing plate 14 has safety valve 20 between the pair of output terminals 16. Safety valve 20 is configured to open to release gas inside outer can 10 to the outside when an inner pressure of outer can 10 increases above a predetermined value. Safety valve 20 of each electricity storage device 2 is connected to a gas duct (not illustrated). The gas inside the electricity storage device is discharged to the gas duct via safety valve 20. For example, safety valve 20 includes: a thin-walled portion that is provided in a portion of sealing plate 14 and is thinner than any other portion; and a linear groove formed in the surface of the thin-walled portion. This configuration tears the thin-walled portion to open safety valve 20 when the inner pressure of outer can 10 increases.

The plurality of electricity storage devices 2 are arranged side by side at predetermined intervals with their long-side surfaces facing each other, thereby forming an assembly. In this exemplary embodiment, a direction in which the plurality of electricity storage devices 2 are arranged is defined as a direction X. Output terminals 16 of each electricity storage device 2 are arranged so as to face in the same direction. In this exemplary embodiment, for convenience, output terminals 16 of each electricity storage device 2 are arranged so as to face upward in the vertical direction. Alternatively, output terminals 16 of each electricity storage device 2 may be arranged so as to face different directions. Two electricity storage devices 2 disposed adjacent to each other are stacked with positive electrode terminal 16a of one of electricity storage devices 2 positioned next to negative electrode terminal 16b of the other. Positive electrode terminal 16a is electrically connected to negative electrode terminal 16b via a bus bar (not illustrated). Alternatively, output terminals 16 of the same polarity in the plurality of electricity storage devices 2 disposed adjacent to one another may be connected together in parallel by a bus bar to form an electricity storage device block. Then, electricity storage device blocks formed in this manner may be connected together in series.

Separator 4, which is also called an insulating spacer, may be made of an insulating resin, for example. Separator 4 is disposed between two electricity storage devices 2 disposed adjacent to each other, thereby electrically insulating two electricity storage devices 2 from each other. Furthermore, separators 4 are individually disposed between electricity storage devices 2 and corresponding end plates 6 to insulate electricity storage devices 2 from end plates 6. An example of a resin forming separators 4 may be a thermoplastic resin, such as polypropylene (PP), polybutylene terephthalate (PBT), polycarbonate (PC), and Noryl (registered trademark) resin (modified PPE).

Separators 4 partly extend in the direction X to cover the upper surfaces of respective electricity storage devices 2. This configuration can secure creepage distances between electricity storage devices 2 disposed adjacent to each other and between electricity storage devices 2 and corresponding end plates 6. Each of separators 4 has openings at locations corresponding to output terminals 16 and safety valve 20 so that output terminals 16 and safety valves 20 are exposed.

The plurality of electricity storage devices 2 and the plurality of separators 4 are arranged side by side between the pair of end plates 6. The pair of end plates 6 are arranged adjacent to electricity storage devices 2 disposed at the respective ends in the direction X with separators 4 therebetween. Each of end plates 6 may be a metal plate, for example. The surfaces of end plates 6 which face corresponding long-side surfaces 18 of electricity storage devices 2 each have screw holes (not illustrated) into which screws 22 are to be screwed.

Each of the pair of restraint members 8, which is also called a bind bar, is a member elongated in the direction X. The pair of restraint members 8 are arranged so as to face each other in a first direction (a direction Y in this exemplary embodiment) which is orthogonal to the direction X and in which the pairs of output terminals 16 are arrayed. Disposed between the pair of restraint members 8 are the plurality of electricity storage devices 2, the plurality of separators 4, and the pair of end plates 6. Each of restraint members 8 includes: flat surface 8a that has a rectangular shape and extends parallel to the short-side surfaces of electricity storage devices 2; and four canopies 8b that protrude from the respective sides of flat surface 8a to electricity storage devices 2. Out of canopies 8b, two facing each other in the direction X each have through-holes (not illustrated) into which screws 22 are to be inserted. Flat surface 8a has opening 8c via which the corresponding short-side surfaces of electricity storage devices 2 are exposed.

The plurality of electricity storage devices 2 and the plurality of separators 4 are alternately arrayed between the pair of end plates 6 in the direction X and between the pair of restraint members 8 in the direction Y. Restraint members 8 are individually disposed with the through-holes of corresponding canopies 8b aligned with the screw holes of end plates 6. Then, screws 22 are inserted into and passed through the through-holes and screwed into the screw holes. By engaging the pair of restraint members 8 with the pair of end plates 6 in this manner, the plurality of electricity storage devices 2 are restrained.

Being pressed in the direction X by restraint members 8, the plurality of electricity storage devices 2 are positioned in the direction X. Furthermore, the upper and bottom surfaces of the plurality of electricity storage devices 2 abut against two canopies 8b with separators 4 therebetween, two canopies 8b facing each other in a direction Z in which the upper and lower surfaces are aligned. In this way, the plurality of electricity storage devices 2 are positioned in the direction Z. As an example, after this positioning has been completed, the bus bars are attached to output terminals 16 of electricity storage devices 2 so that output terminals 16 of the plurality of electricity storage devices 2 are electrically connected together. For example, the bus bars are welded to corresponding output terminals 16.

The upper surfaces of the plurality of electricity storage devices 2 are covered with a cover member (not illustrated). This cover member helps prevent dew condensation water, dust, and other contaminants from making contact with output terminals 16, the bus bars, safety valves 20, and other parts of electricity storage devices 2. The cover member may be made of an insulating resin, for example.

Figure 3:
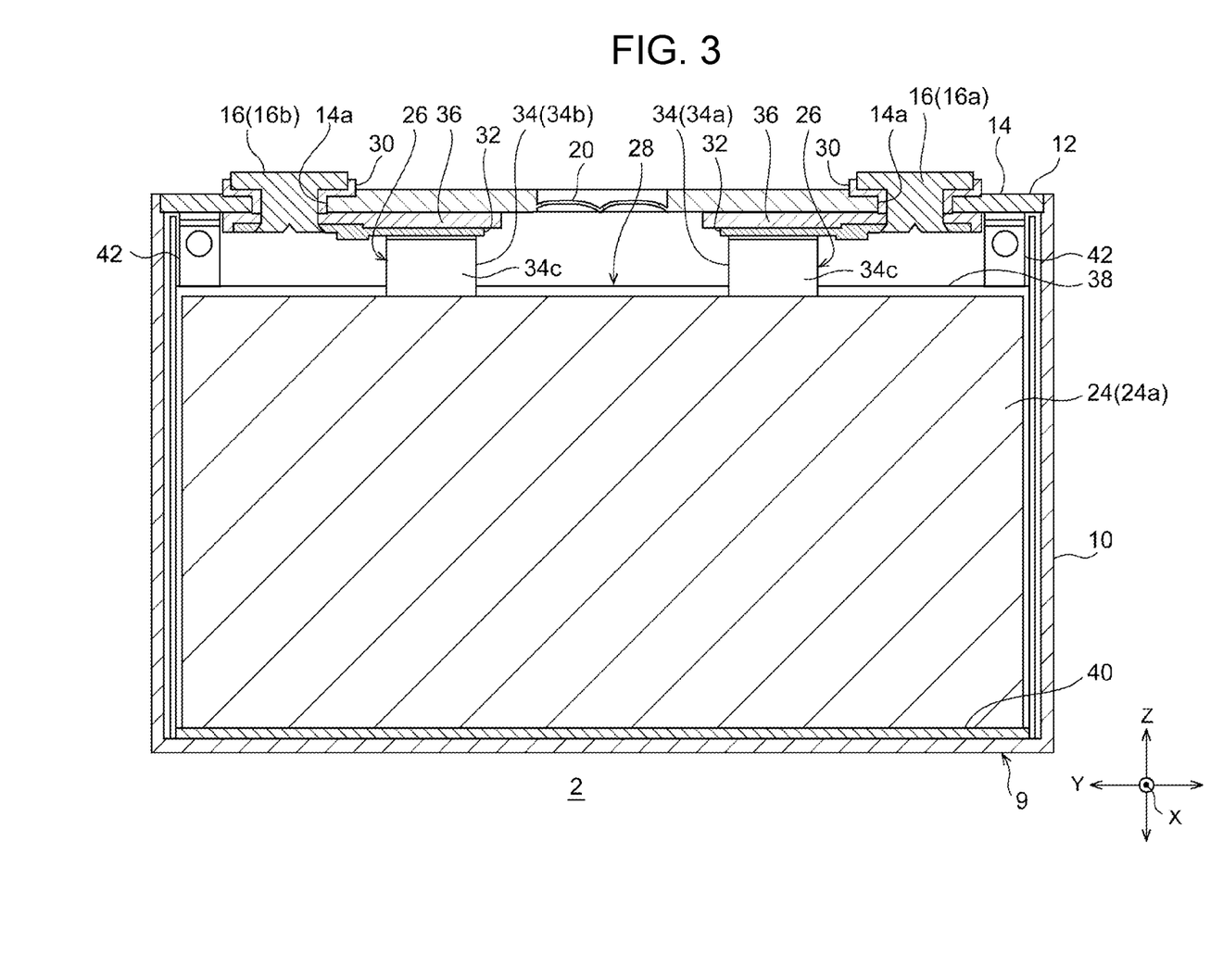
FIG. 3 is a cross-sectional view of the electricity storage device.
Figure 4:
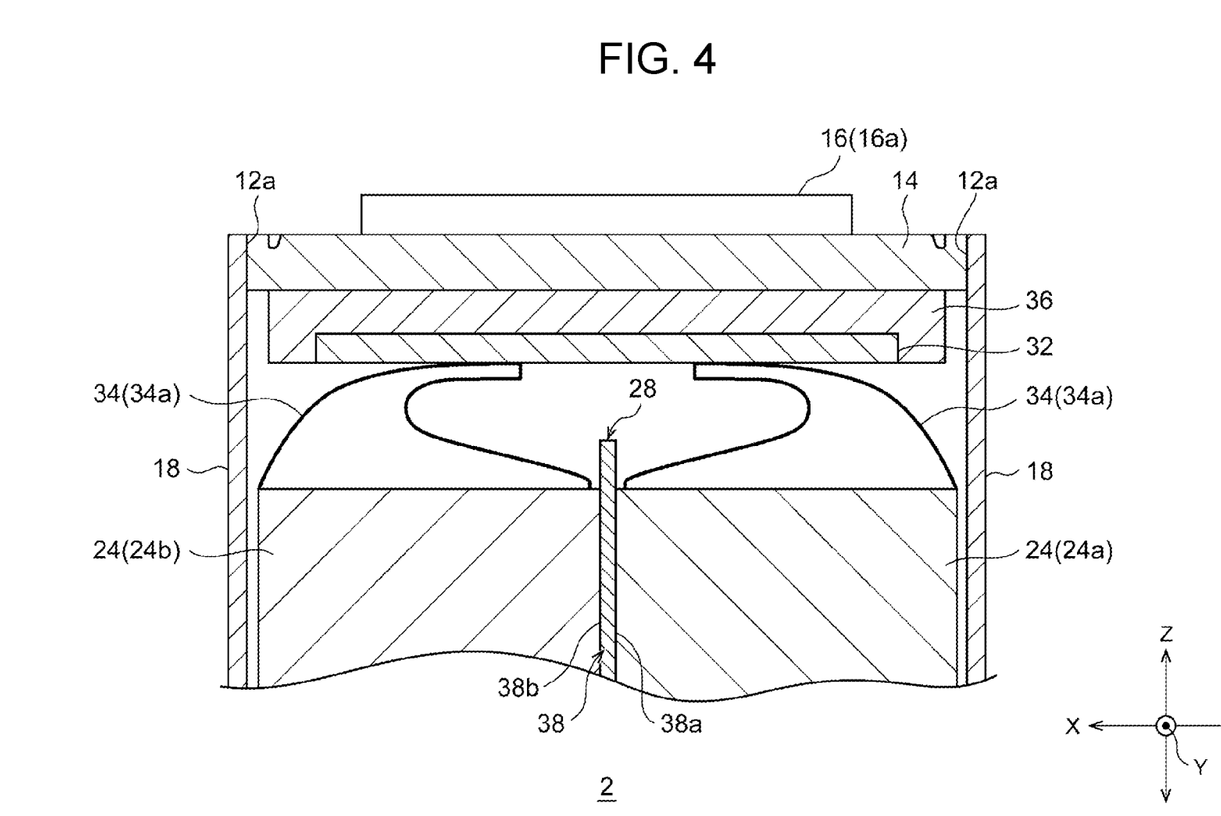
FIG. 4 is a cross-sectional view of a region, including an upper surface, of the electricity storage device.
Figure 5:
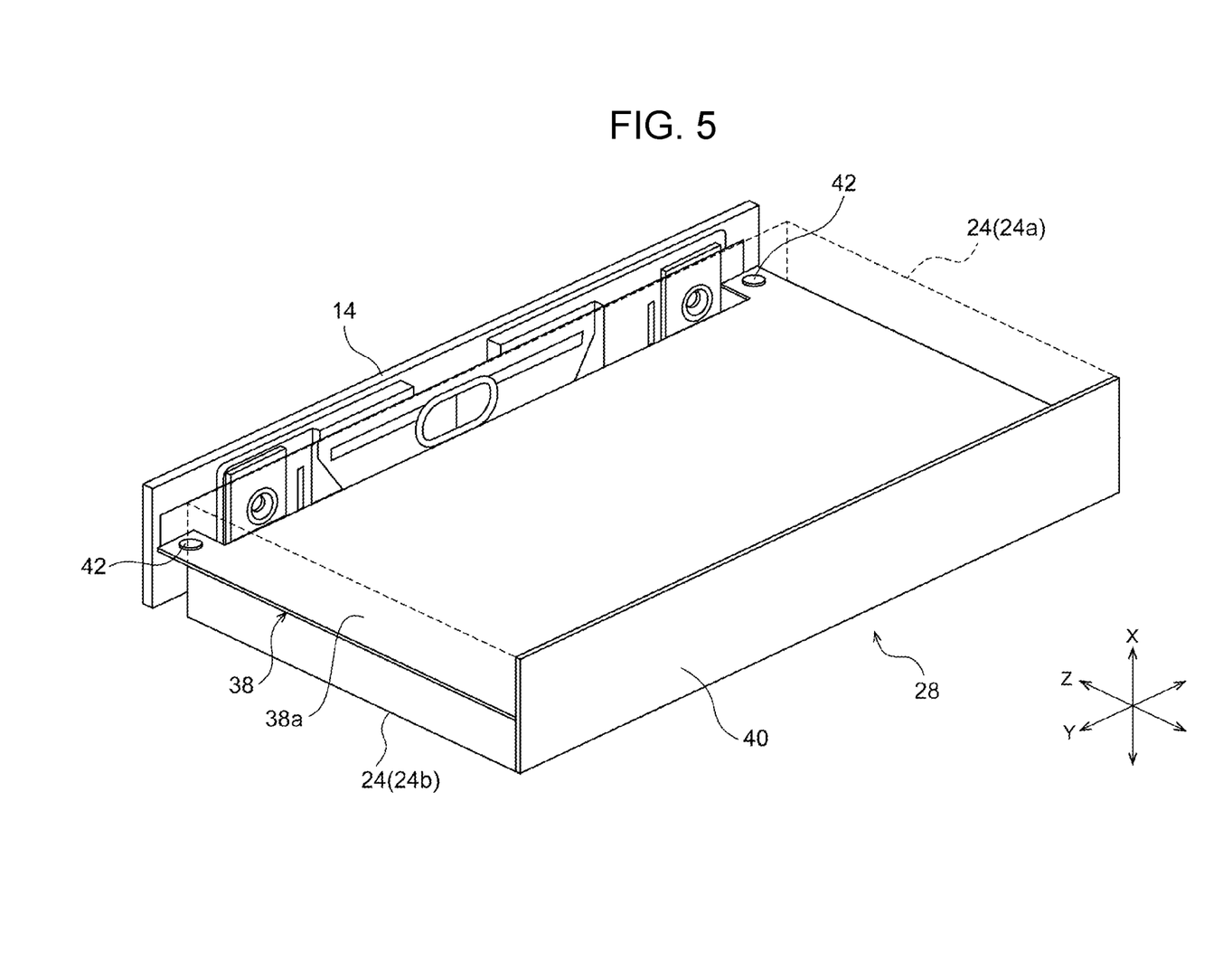
FIG. 5 is a perspective view of an interior of an outer can.

FIG. 3 is a cross-sectional view of the electricity storage device. FIG. 4 is a cross-sectional view of a region, including an upper surface, of the electricity storage device. FIG. 5 is a perspective view of an interior of the outer can. FIG. 3 illustrates a cross section of electricity storage device 2 taken along a plane widened in the directions Y and Z, that is, along the YZ plane. FIG. 4 illustrates a cross section of electricity storage device 2 taken along a plane widened in the directions X and Z, that is, along the XZ plane. Further, FIG. 3 and FIG. 4 each schematically illustrate electrode bodies 24. FIG. 4 schematically illustrates a bundle of collector tabs 34. FIG. 5 illustrates first electrode body 24a in a transparent fashion.

Each electricity storage device 2 includes outer can 10, sealing plate 14, the pair of output terminals 16, electrode bodies 24, current collectors 26, and electrode body holder 28. As described above, outer can 10, which is a flat rectangular parallelepiped container, includes: opening 12 having a rectangular shape; and the pair of long-side surfaces 18 connected to two long edges 12a of opening 12 which face each other. Sealing plate 14, which is a plate that closes opening 12, includes through-holes 14a at both ends in the longitudinal direction. The pair of output terminals 16 are inserted into and passed through respective through-holes 14a. Disposed between the pair of output terminals 16 and corresponding through-holes 14a are insulating sealing members 30. Sealing plate 14 further includes safety valve 20 between two through-holes 14a.

Outer can 10 houses electrode bodies 24, current collectors 26, and electrode body holder 28. Each of electrode bodies 24 has a structure in which a plurality of electrode plates are stacked. More specifically, each electrode body 24 has a structure in which positive electrode plates, which are plates of a positive electrode, and negative electrode plates, which are plates of a negative electrode, are alternately stacked. Disposed between a positive electrode plate and a negative electrode plate stacked adjacent to each other is an electrode plate separator. In this exemplary embodiment, two electrode bodies 24 are housed in outer can 10 with electrode body holder 28 therebetween.

The pair of output terminals 16 disposed on sealing plate 14 are electrically connected to respective electrode bodies 24 by current collectors 26. Each of current collectors 26 has collector plate 32 and collector tab 34. Collector plate 32 is fixed to a surface of sealing plate 14 which faces the interior of outer can 10 with corresponding insulating plate 36 therebetween. Furthermore, collector plate 32 is connected to an edge of corresponding output terminal 16 disposed inside outer can 10.

Collector tabs 34 are band-shaped (tongue-piece-shaped) parts that extend from the electrode plates of electrode bodies 24 and are connected to collector plates 32. Collector tabs 34 are arranged so as to face in a second direction (a direction X or Z in this exemplary embodiment) in which main surfaces 34c intersect the first direction (the direction Y in this exemplary embodiment) in which the pair of output terminals 16 are arranged. In short, ends of collector tabs 34 adjacent to electrode bodies 24 extend in the direction Y. Furthermore, collector tabs 34 extend toward collector plates 32 while curving in the direction X and are connected to collector plates 32. Therefore, main surface 34c of each of collector tabs 34 is oriented in the direction X in some areas and also oriented in the direction Z in other areas while facing sealing plate 14.

Collector tabs 34 include: positive electrode tab 34a that extends from the positive electrode plate; and negative electrode tab 34b that extends from the negative electrode plate. Positive electrode tab 34a extending from the positive electrode plate is connected to collector plate 32 fixed to positive electrode terminal 16a, whereas negative electrode tab 34b extending from the negative electrode plate is connected to collector plate 32 fixed to negative electrode terminal 16b. Hereinafter, when it is not necessary to distinguish the polarities of collector tabs 34 from each other, positive electrode tab 34a and negative electrode tab 34b are collectively referred to as collector tabs 34. Collector tabs 34 of the same poles are bundled together to constitute a collector tab stack body. This stack body is joined to collector plate 32 by ultrasonic welding or another welding method.

Electrode body holder 28 suppresses electrode bodies 24 from being displaced inside outer can 10. Each electricity storage device 2 includes electrode body holder 28 having an insulating property which is fixed to sealing plate 14 to suppress the displacement of electrode bodies 24. Electrode body holder 28 is housed in outer can 10 and has flat plate 38 that extends in a direction intersecting a direction in which each electrode body 24 and sealing plate 14 are arranged. The direction in which each electrode body 24 and sealing plate 14 are arranged is the direction Z, whereas the direction tolerate this direction is one or both of the directions X and Y.

Electrode body holder 28 in this exemplary embodiment has flat plate 38 and bottom plate 40. Flat plate 38 extends inside outer can 10 so as to be parallel to long-side surfaces 18. In short, flat plate 38 extends both in the direction Y in which the pair of output terminals 16 are arranged and in the direction Z in which the upper and bottom surfaces of each electricity storage device 2 are arranged. Furthermore, flat plate 38 extends parallel along a width (the direction Y in this exemplary embodiment) of collector tabs 34. Flat plate 38 is disposed in a substantially center of outer can 10 in the direction X to separate an inner space of outer can 10 into two. The two spaces separated from each other by flat plate 38 are arranged in the direction X and house respective electrode bodies 24. More specifically, one of the spaces houses first electrode body 24a, whereas the other space houses second electrode body 24b.

Bottom plate 40 extends from an edge of flat plate 38 opposite sealing plate 14, that is, the edge from the bottom surface of each electricity storage device 2 in a direction intersecting a direction in which flat plate 38 extends. Bottom plate 40 in this exemplary embodiment extends parallel to the bottom surfaces of sealing plate 14 and each electricity storage device 2. Bottom plate 40, which has a rectangular shape similar to sealing plate 14, abuts against the bottom surface of outer can 10. Flat plate 38 is connected to a center of a main surface of bottom plate 40 in the direction X, the main surface facing sealing plate 14. Both bottom plate 40 and flat plate 38 define storage chambers for respective electrode bodies 24.

Both of electrode bodies 24 are bonded and fixed to flat plate 38. More specifically, flat plate 38 is disposed with first main surface 38a facing first electrode body 24a and with second main surface 38b on an opposite side of first main surface 38a facing second electrode body 24b. First electrode body 24a is fixed to first main surface 38a with adhesive, whereas second electrode body 24b is fixed to second main surface 38b with adhesive. In this case, each electrode body 24 is bonded and fixed to flat plate 38 with its bottom surface, that is, the bottom side of each electricity storage device 2 abutting against bottom plate 40. Therefore, each electrode body 24 is also supported by bottom plate 40.

Bottom plate 40 facilitates positioning of electrode bodies 24 and electrode body holder 28 in the direction Z. Furthermore, when sealing plate 14, electrode body holder 28, and electrode bodies 24 that are fixed to each other are mounted inside outer can 10, the positions of bottom plate 40 to sealing plate 14 in the direction Z can be easily fixed. Therefore, it is possible to assemble sealing plate 14, electrode body holder 28, and electrode bodies 24 with low assembling tolerances. Further, since sealing plate 14 can be positioned inside outer can 10 via bottom plate 40, the bonding is easily performed if sealing plate 14 is bonded to outer can 10 with welding.

Electrode body holder 28 has an insulating property. For example, electrode body holder 28 may be made of an insulating resin, similar to separator 4. Examples of a resin forming electrode body holder 28 include thermoplastic resins, such as polypropylene (PP), polybutylene terephthalate (PBT), polycarbonate (PC), and Noryl (registered trademark) resin (modified PPE). Furthermore, electrode body holder 28 is preferably more rigid than each collector tab 34.

Electrode body holder 28 is fixed at an edge of flat plate 38 adjacent to sealing plate 14 to sealing plate 14. Electrode bodies 24 are thereby fixed to outer can 10 via both electrode body holder 28 and sealing plate 14. Fixing electrode bodies 24 to outer can 10 can suppress electrode bodies 24 from being displaced relative to outer can 10, for example, when vibration is transmitted from a target to which electricity storage module 1 is fixed to each electricity storage device 2. This can lighten a load placed on collector tabs 34 by which output terminals 16 are connected to electrode bodies 24. Furthermore, both sides of bottom plate 40 in the direction X abut against respective long-side surfaces 18 of outer can 10. The lower side of flat plate 38 thereby can be positioned in the direction X. This can further suppress electrode body 24 from being displaced relative to outer can 10. In this case, a size of bottom plate 40 in the direction X may be smaller than a total size of electrode bodies 24 and flat plate 38 in the direction X.

Each electricity storage device 2 includes a pair of fixing mechanisms 42. The pair of fixing mechanisms 42 are arranged, in a width direction of collector tabs 34, on a side of flat plate 38 adjacent to sealing plate 14 and fix electrode body holder 28 to sealing plate 14. In other words, the pair of fixing mechanisms 42 are disposed on both ends of flat plate 38 in the first direction in which the pair of output terminals 16 are arranged and fix electrode body holder 28 to sealing plate 14. An attitude of collector tabs 34 is fixed so that main surface 34c partly faces sealing plate 14. In other words, the attitude of collector tabs 34 is fixed so that main surface 34c faces in the second direction, which intersects the first direction. Therefore, collector tabs 34 are less likely to be displaced in the first direction than in any other direction. However, the pair of fixing mechanisms 42 arranged in the first direction fix electrode body holder 28 to sealing plate 14, thereby successfully suppressing electrode bodies 24 from being displaced especially in the first direction. This can further lighten a load placed on collector tabs 34.

The pair of fixing mechanisms 42 are preferably arranged with collector tabs 34 therebetween. This arrangement more reliably holds electrode bodies 24 against vibration transmitted to each electricity storage device 2 in the width direction (first direction) of collector tabs 34. In this exemplary embodiment, fixing mechanisms 42 are arranged outside collector tabs 34 of each electricity storage device 2 in the first direction. This arrangement can reliably suppress electrode bodies 24 from being displaced in the first direction. Furthermore, fixing mechanisms 42 are arranged outside output terminals 16 of each electricity storage device 2 in the first direction. This arrangement can further suppress electrode bodies 24 from being displaced in the first direction.

Figure 6:
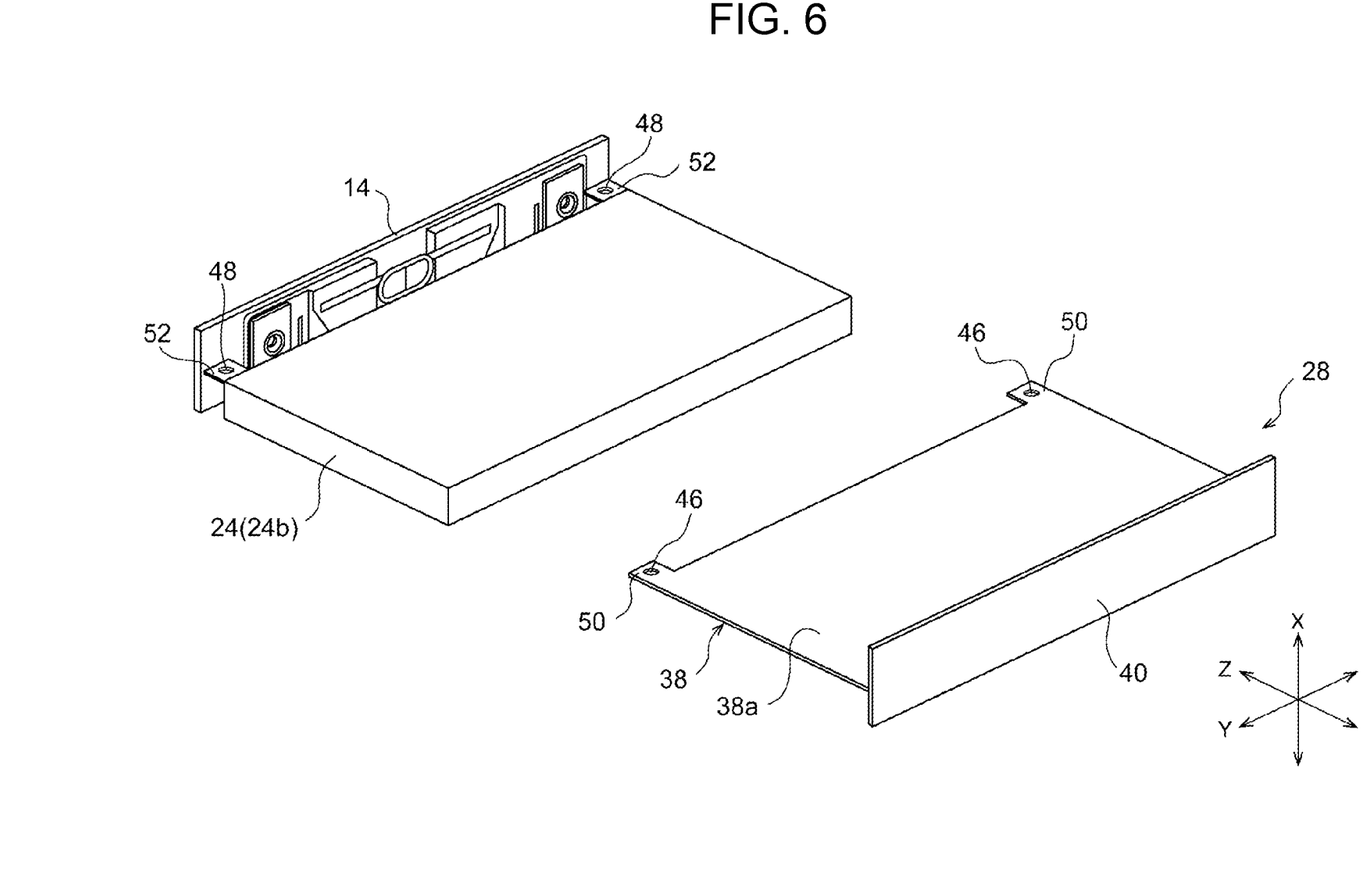
FIG. 6 is an exploded perspective view of the interior of the outer can.
Figure 7:
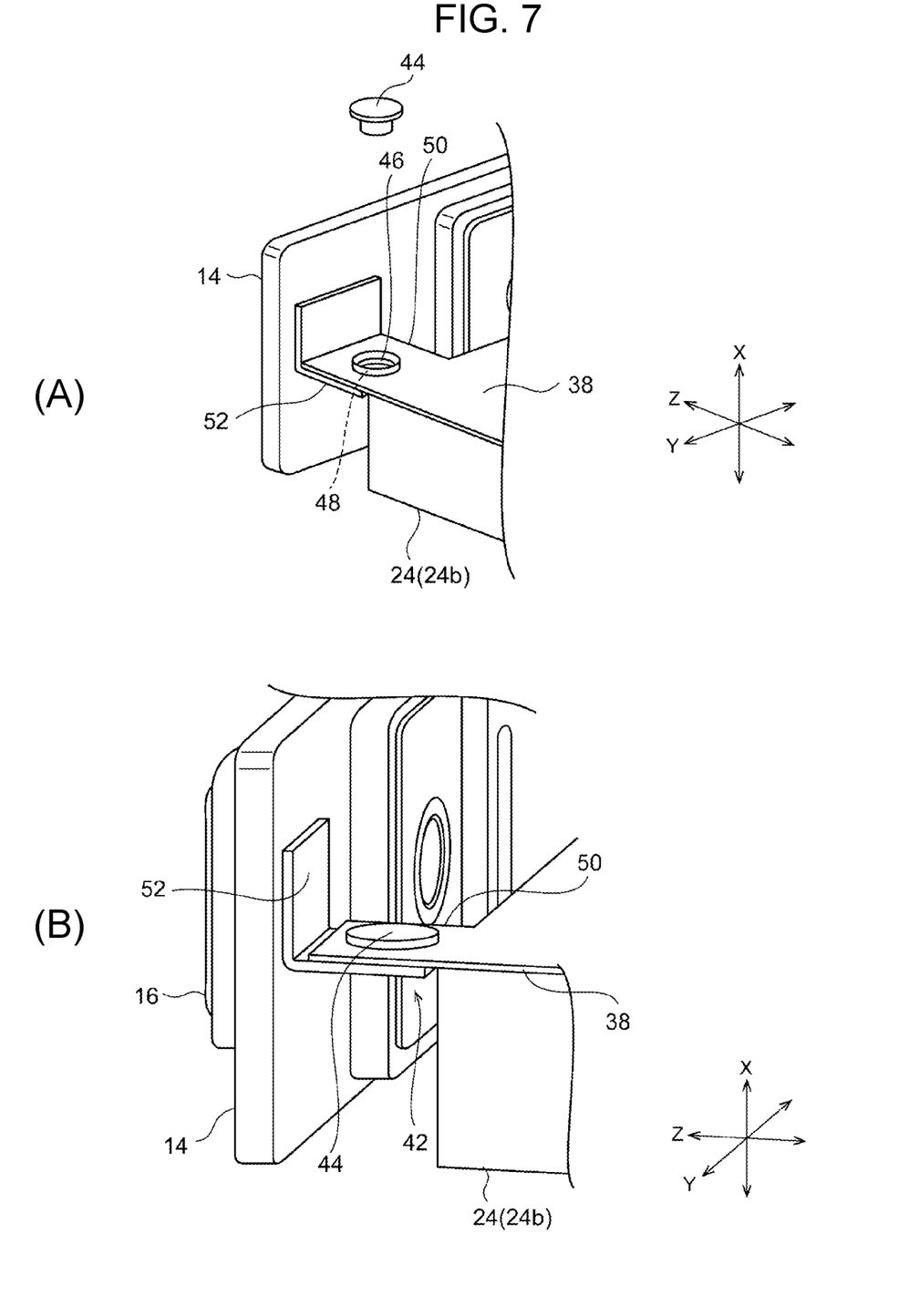
FIGS. 7(A) and 7(B) are each an enlarged perspective view of a region including a fixing mechanism.

FIG. 6 is an exploded perspective view of the interior of the outer can. FIGS. 7(A) and 7(B) are each an enlarged perspective view of a region including a fixing mechanism. Neither of FIGS. 6, 7(A), and 7(B) illustrates first electrode body 24a. Further, FIG. 7A illustrates a state where electrode body holder 28 is not yet fixed to sealing plate 14, whereas FIG. 7B illustrates a state where electrode body holder 28 has been fixed to sealing plate 14.

Each of fixing mechanisms 42 in this exemplary embodiment includes rivet 44, first through-hole 46, and second through-hole 48. First through-hole 46 is provided in electrode body holder 28. Second through-hole 48 is provided in sealing plate 14.

More specifically, flat plate 38 of electrode body holder 28 has first fixing tabs 50 that protrude from its side adjacent to sealing plate 14 toward sealing plate 14. First fixing tabs 50 may be molded integrally with flat plate 38. First through-holes 46 are provided across first fixing tabs 50 in the direction X.

Sealing plate 14 has second fixing tabs 52 on its surface facing electrode body holder 28. Each of second fixing tabs 52 has a structure in which a band-shaped metal plate is bent into a substantially L-shape with one side fixed to a surface of sealing plate 14 and with the other side protruding from the surface of sealing plate 14 toward electrode body holder 28. Second fixing tabs 52 may be fixed to sealing plate 14 by welding or another bonding method. Second through-holes 48 are provided in portions of second fixing tabs 52 which protrude toward electrode body holder 28 so as to be formed across these portions in the direction X. Each of second fixing tabs 52 is preferably more rigid than each collector tab 34.

Sealing plate 14 and electrode body holder 28 are arranged with first fixing tabs 50 aligned with respective second fixing tabs 52 in the direction X. Further, sealing plate 14 and electrode body holder 28 are positioned with first through-holes 46 aligned with respective second through-holes 48. Moreover, rivets 44 are inserted into and passed through first through-holes 46 and second through-holes 48, and then the ends of rivets 44 passed are crimped. In this way, electrode body holder 28 is fixed to sealing plate 14. Alternatively, instead of rivets 44, screws may be inserted into and passed through first through-holes 46 and second through-holes 48, and then nuts may be made to engage with the ends of the screws, so that electrode body holder 28 is fixed to sealing plate 14.

In this exemplary embodiment, each of first through-holes 46 and second through-holes 48 has a circular opening (perfectly circular opening). However, the shape of each opening is not limited to be circular. For example, each opening may have a non-circular shape, such as an elliptical or a square shape. First through-holes 46 and second through-holes 48 may each have a non-circular opening, and portions of rivets 44 fitted into first through-holes 46 and second through-holes 48 may each have a non-circular cross-section. This configuration, when rivet 44 is inserted into first through-hole 46 and second through-hole 48, can suppress both first fixing tab 50 and second fixing tab 52 from rotating around rivet 44.

As described above, each electricity storage device 2 according to this exemplary embodiment includes: outer can 10 having opening 12; electrode bodies 24 housed in outer can 10; sealing plate 14 that closes opening 12; the pair of output terminals 16 arranged on sealing plate 14; current collectors 26 by which electrode bodies 24 are electrically connected to the pair of output terminals 16; and electrode body holder 28 that is housed in outer can 10, includes flat plate 38 extending in a direction intersecting a direction in which each of electrode bodies 24 and sealing plate 14 are arranged, and is fixed to sealing plate 14 to suppress displacement of electrode bodies 24, electrode body holder 28 having an insulating property.

More specifically, each electricity storage device 2 includes: outer can 10 that has opening 12 and a pair of long-side surfaces 18; electrode bodies 24 housed in outer can 10; sealing plate 14 that closes opening 12; the pair of output terminals 16 arranged on sealing plate 14; current collectors 26 by which electrode bodies 24 are electrically connected to the pair of output terminals 16; and electrode body holder 28 that has an insulating property. Electrode body holder 28 includes: flat plate 38 that extends inside outer can 10 so as to be parallel to long-side surfaces 18; and bottom plate 40 that extends, in a direction intersecting a direction in which flat plate 38 extends, from an edge of flat plate 38 opposite sealing plate 14. Electrode body holder 28 is fixed at an edge of flat plate 38 adjacent to sealing plate 14 to sealing plate 14. Mounting the electrode body holder 28 in outer can 10 can define storage chambers for respective electrode bodies 24 inside outer can 10. This configuration can suppress electrode bodies 24 from being displaced inside outer can 10.

As a method of suppressing expansion of each electricity storage device 2, in other words, expansion of outer can 10, a method of reserving a space between outer can 10 and each electrode body 24 in which electrode bodies 24 are allowed to expand is conceivable. This space is reserved, for example, between each long-side surface 18 of outer can 10 and each electrode body 24. Reserving the space between outer can 10 and each electrode body 24 makes it possible for this space to at least partly absorb expanded electrode body 24, thereby successfully suppressing the expansion of outer can 10. As a result, it is possible to suppress an increase in an inner volume of each electricity storage device, thereby successfully suppressing a decreased capacity of each electricity storage device 2 and an increased internal resistance of each electricity storage device 2. In addition, it is also possible to suppress damage to a contact portion between outer can 10 and sealing plate 14.

However, reserving the space between outer can 10 and each electrode body 24 makes electrode bodies 24 more likely to be displaced relative to outer can 10 due to vibration of each electricity storage device 2. The displacement of each electrode body 24 relative to outer can 10 may concentrate stress on collector tabs 34 by which electrode bodies 24 are connected to output terminals 16, thereby causing fatigue failure in collector tabs 34.

In contrast with the above, each electricity storage device 2 in this exemplary embodiment includes electrode body holder 28 that suppresses each electrode body 24 from being displaced relative to outer can 10. Thus, in addition to reserving the space between outer can 10 and each electrode body 24 to suppress the expansion of outer can 10, providing electrode body holder 28 to suppress the displacement of electrode bodies 24 can lighten the load placed on collector tabs 34. This successfully maintains a stable electrical connection state between each electrode body 24 and output terminal 16. Since electrode body holder 28 and collector tabs 34 are both fixed to each electrode body 24 and sealing plate 14, it is possible to more reliably lighten the load on collector tabs 34. With this exemplary embodiment, the reliability of each electricity storage device 2 can be enhanced. Moreover, the reliability of electricity storage module 1 that includes an assembly of electricity storage devices 2 as described above can be enhanced. Consequently, it is possible to achieve high-capacity electricity storage module 1 with its reliability maintained.

In this exemplary embodiment, electrode bodies 24 are bonded and fixed to flat plate 38 of electrode body holder 28. This configuration can more reliably suppress the displacement of each electrode body 24. Consequently, it is possible to enhance the reliability of electricity storage module 1.

Main surfaces 34c of collector tabs 34 face in the second direction, which intersects the first direction in which the pair of output terminals 16 are arranged. Therefore, collector tabs 34 may develop fatigue failure when each electrode body 24 is displaced in the first direction. In contrast with this, each electricity storage device 2 includes the pair of fixing mechanisms 42 on both ends of flat plate 38 in the first direction, in which the pair of output terminals 16 are arranged. This configuration can more reliably suppress each electrode body 24 from being displaced in the first direction. Consequently, it is possible to enhance the reliability of electricity storage module 1.

Each of fixing mechanisms 42 in this exemplary embodiment includes: rivet 44 or a screw; and first through-hole 46 and second through-hole 48 into which rivet 44 or the screw is to be inserted. First through-hole 46 is provided in electrode body holder 28, and second through-hole 48 is provided in sealing plate 14. This configuration can firmly fix electrode body holder 28 to sealing plate 14. Consequently, it is possible to more reliably suppress the displacement of each electrode body 24, thereby successfully further enhancing the reliability of electricity storage module 1.

Second Exemplary Embodiment

Figure 8:
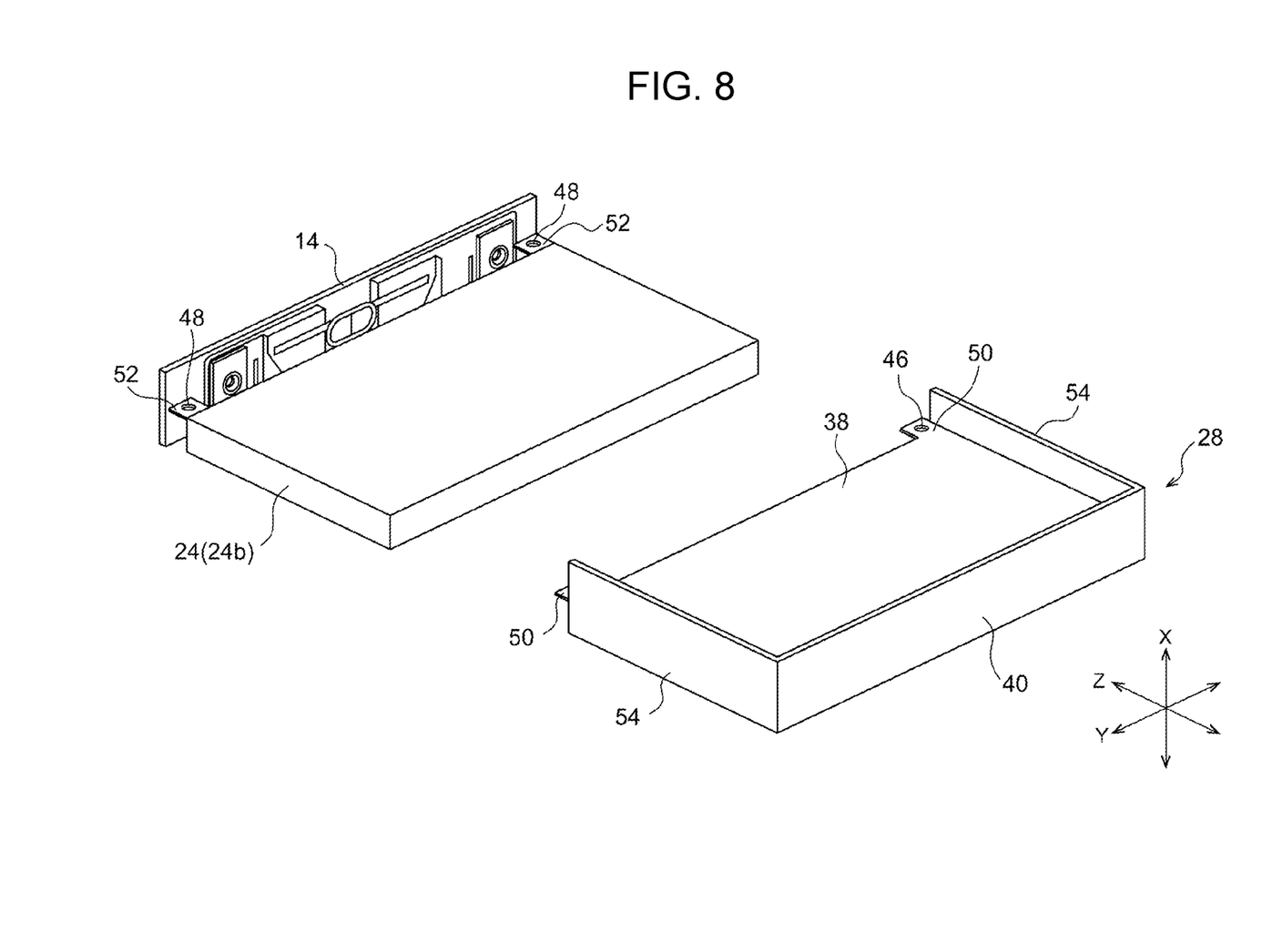
FIG. 8 is an exploded perspective view of an interior of an outer can of an electricity storage device according to a second exemplary embodiment.

The second exemplary embodiment has the same configuration as that of the first exemplary embodiment, except for the shape of the electrode body holder. Hereinafter, this exemplary embodiment will be described mainly regarding a configuration different from that of the first exemplary embodiment. Common configurations will be described briefly or will not be described. FIG. 8 is an exploded perspective view of an interior of an outer can of an electricity storage device according to a second exemplary embodiment. FIG. 8 does not illustrate first electrode body 24a.

Each electricity storage device 2 according to this exemplary embodiment includes outer can 10, electrode bodies 24, sealing plate 14, a pair of output terminals 16, current collectors 26, and electrode body holder 28. Electrode body holder 28 includes: flat plate 38; and bottom plate 40 that extends, in a direction (direction X) intersecting a direction in which flat plate 38 extends, from a side of flat plate 38 opposite sealing plate 14. Electrode body holder 28 further includes wall 54 that extends, in a direction (direction X) intersecting a direction in which flat plate 38 extends, from at least one of sides of flat plate 38 in a first direction in which the pair of output terminals 16 are arranged, that is, in a width direction (direction Y) of collector tabs 34. Electrode body holder 28 in this exemplary embodiment has a pair of walls 54 extending, in the direction X, from both sides of flat plate 38 in the direction Y.

Each of walls 54 in this exemplary embodiment extends parallel to short-side surfaces of each electricity storage device 2. Each wall 54 has a rectangular shape, similar to short-side surfaces of each electricity storage device 2. Flat plate 38 is connected to main surfaces of walls 54 at their centers in the direction X. Ends of walls 54 opposite sealing plate 14 are connected to respective ends of bottom plate 40 in the direction Y. As a result, all of bottom plate 40 and the pair of walls 54 surround flat plate 38 from its three sides.

All of flat plate 38, bottom plate 40, and the pair of walls 54 define storage chambers for respective electrode bodies 24.

As in the first exemplary embodiment, a pair of fixing mechanisms 42, which are arranged at both sides of flat plate 38 in the first direction in which the pair of output terminals 16 are arranged, fix electrode body holder 28 to sealing plate 14. As in the first exemplary embodiment, each of fixing mechanisms 42 in this exemplary embodiment includes rivet 44, first through-hole 46, and second through-hole 48.

As in this exemplary embodiment, collector tabs 34 are arranged with main surface 34c facing in a second direction intersecting the first direction in which output terminals 16 are arranged. Therefore, collector tabs 34 are less likely to be displaced in the first direction than in any other direction. In contrast with this, electrode body holder 28 has the pair of walls 54 arranged in the first direction with flat plate 38 therebetween. Thus, electrode body 24 can be disposed between the pair of walls 54 in the first direction. This configuration can further suppress each electrode body 24 from being displaced in the first direction, thereby successfully further enhancing reliability of each electricity storage device 2 and thus reliability of electricity storage module 1. Each wall 54 may be configured such that its size in a direction perpendicular to the direction in which flat plate 38 extends is smaller than a total thickness of electrode bodies 24 and flat plate 38. This configuration can facilitate insertion of electrode body holder 28 into outer can 10.

Third Exemplary Embodiment

Figure 9:
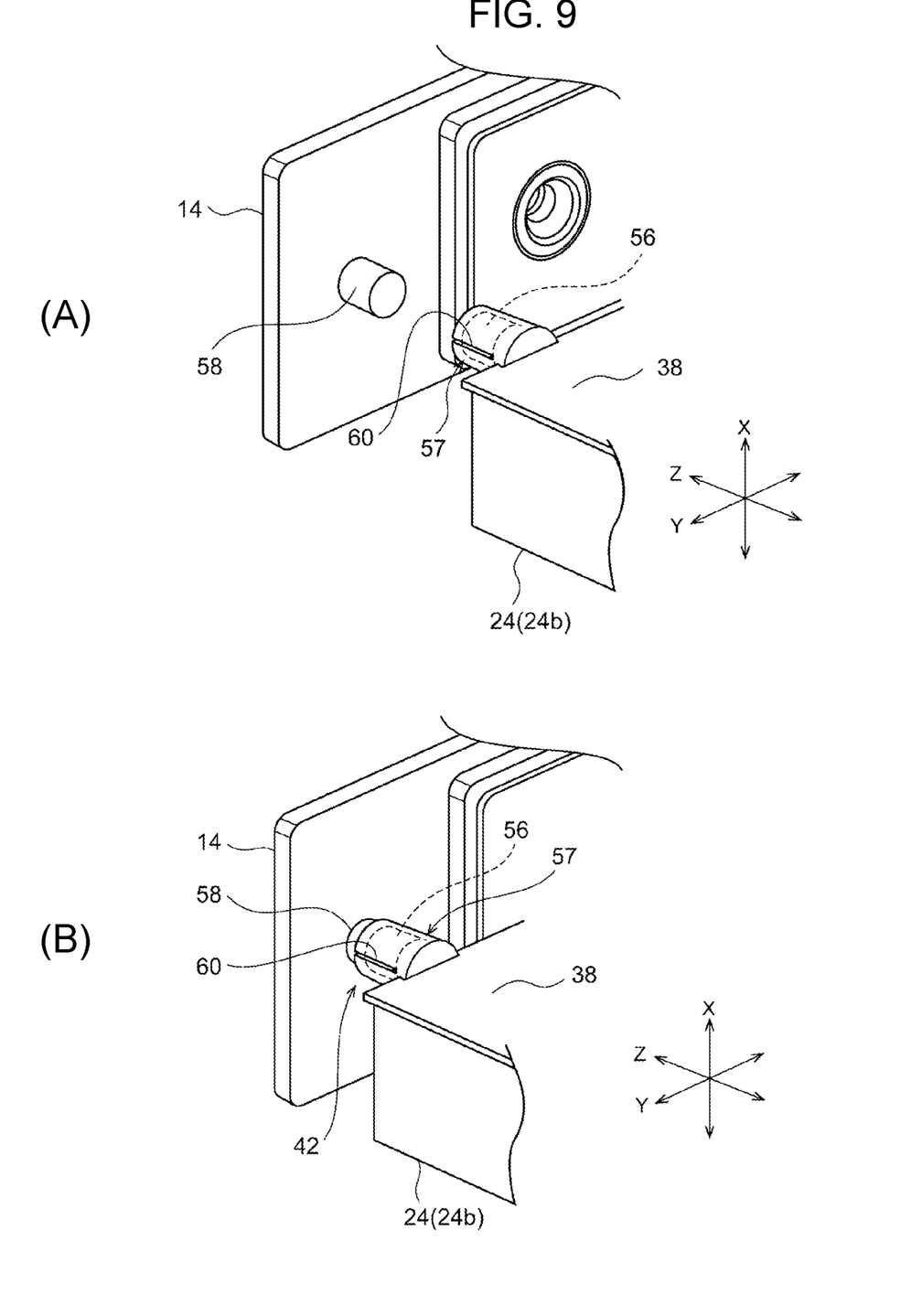
FIGS. 9(A) and 9(B) are each an enlarged perspective view of a region, including a fixing mechanism, of an electricity storage device according to a third exemplary embodiment.

The third exemplary embodiment has the same configuration as that of the first exemplary embodiment, except for the structure of the fixing mechanisms. Hereinafter, this exemplary embodiment will be described mainly regarding a configuration different from that of the first exemplary embodiment. Common configurations will be described briefly or will not be described. FIGS. 9(A) and 9(B) are each an enlarged perspective view of a region, including a fixing mechanism, of an electricity storage device according to a third exemplary embodiment. Neither of FIGS. 9(A) and 9(B) illustrates first electrode body 24a. Further, FIG. 9A illustrates a state where electrode body holder 28 is not yet fixed to sealing plate 14, whereas FIG. 9B illustrates a state where electrode body holder 28 has been fixed to sealing plate 14.

Each electricity storage device 2 according to this exemplary embodiment includes outer can 10, electrode bodies 24, sealing plate 14, a pair of output terminals 16, current collectors 26, and electrode body holder 28. Electrode body holder 28 includes: flat plate 38; and bottom plate 40 that extends, in a direction (direction X) intersecting a direction in which flat plate 38 extends, from a side of flat plate 38 opposite sealing plate 14.

Each electricity storage device 2 includes a pair of fixing mechanisms 42. The pair of fixing mechanisms 42 are arranged on both ends of flat plate 38 in a first direction in which a pair of output terminals 16 are arranged and fix electrode body holder 28 to sealing plate 14. Each of fixing mechanisms 42 in this exemplary embodiment includes recess 56 and projection 58 to be press-fitted into recess 56. Recesses 56 are provided in electrode body holder 28, whereas projections 58 are provided in sealing plate 14.

More specifically, flat plate 38 of electrode body holder 28 has projection 57, which protrudes from an edge adjacent to sealing plate 14 toward sealing plate 14. Recesses 56 are provided at ends of respective projections 57 and open toward sealing plate 14. Each of projections 57 provided with recesses 56 has slit 60, which allows projection 57 to be elastically deformed when projection 58 is press-fitted into recess 56. For example, each of projections 57 may be molded integrally with flat plate 38. Sealing plate 14 has projections 58 on a surface oriented to electrode body holder 28, projection 58 protruding toward electrode body holder 28. For example, each of projections 58 may be molded integrally with sealing plate 14 by press working or another process. Alternatively, projections 58 that are independent of sealing plate 14 may be joined to sealing plate 14. Each of recesses 56 and projections 58 is preferably more rigid than each collector tab 34.

Sealing plate 14 and electrode body holder 28 are arranged so that central axes of recesses 56 and corresponding projections 58 are positioned on the same linear shapes. Then, while sealing plate 14 and electrode body holder 28 being moved close to each other, projections 58 are press-fitted into corresponding recesses 56. In this way, electrode body holder 28 is fixed to sealing plate 14. Even fixing mechanisms 42 configured above can also firmly fix electrode body holder 28 to sealing plate 14. Consequently, it is possible to more reliably suppress the displacement of each electrode body 24, thereby successfully further enhancing reliability of each electricity storage device 2 and thus reliability of electricity storage module 1. Alternatively, projections 58 may be provided in electrode body holder 28, whereas recesses 56 may be provided in sealing plate 14.

The exemplary embodiments of the present invention have been described in detail. The foregoing exemplary embodiments simply illustrate specific examples for use in performing the present invention. The contents of the exemplary embodiments are not intended to limit the technical scope of the present invention, and allow for many design changes, such as modifications, additions, and deletions of components, without departing from the ideas of the invention specified in the claims. Novel embodiments that employ design changes produce the same effects as in the exemplary embodiments and modifications to be combined. In the foregoing exemplary embodiments, contents that allow for design changes are highlighted by adding a description such as "of this exemplary embodiment" or "in this exemplary embodiment". However, contents without such descriptions may also permit design changes. In addition, any combinations of components included in individual exemplary embodiments are also effective as aspects of the present invention. The hatchings described in cross sections of the drawings are not intended to limit materials of the hatched objects.

Each fixing mechanism 42 may employ a snap-fit structure. For example, each fixing mechanism 42 may include an engaging groove and an engaging claw to be joined together in a snap-fit manner. One of the engaging groove and the engaging claw may be provided in electrode body holder 28, whereas the other of the engaging groove and the engaging claw may be provided in sealing plate 14. Examples of the engaging groove also include a member formed into a hole shape by passing a groove through a member with an engaging groove. Even fixing mechanisms 42 configured above can also firmly fix electrode body holder 28 to sealing plate 14, thereby enhancing reliability of each electricity storage device 2 and thus reliability of electricity storage module 1.

The number of electricity storage devices 2 provided in electricity storage module 1 is not limited to a specific one. Structures of parts of electricity storage module 1, including a shape of separators 4 and a structure for fastening end plates 6 to restraint members 8, are not limited to specific ones. Electricity storage module 1 may include a BR>0 suba plate. The bus bar plate is a plate-shaped member that is disposed so as to face the upper surfaces of the plurality of electricity storage devices 2 and that covers the upper surfaces. When electrode body holder 28 suppresses the displacement of collector tabs 34, a direction of the displacement suppressed is not limited to the direction parallel to long-side surfaces 18 of outer can 10.

The arrangement of electrode bodies 24 and flat plate 38 is not limited to the above. For example, flat plate 38 may be disposed between one electrode body 24 and the side wall of outer can 10. Flat plates 38 may be disposed inside electrode bodies 24 in which the collector tabs 34 are bundled at the positive electrode and the negative electrode. The structure of each electrode body 24 is not limited to a laminated electrode body in which a plurality of positive electrode plates and a plurality of negative electrode plates are alternately stacked with electrode plate separators therebetween. Alternatively, for example, each electrode body 24 may be a flat-wound electrode body in which a band-shaped positive electrode plate and a band-shaped negative electrode plate are wound while stacked with electrode plate separators therebetween and compressed in a predetermined direction. In this case, this flat winding electrode body may be disposed inside outer can 10 in such a way that its winding axis is parallel to the Z-axis. Opening 12 of outer can 10 may have a rectangular shape such as a square shape or a polygonal shape other than a rectangular shape, for example. The outer surface of each electrode body 24 may be covered with an insulating sheet. In this case, the insulating sheet may be bent into a container shape having a bottom and a tubular portion. The upper-side opening of the tubular portion may extend closer to sealing body 14 than rivet 44, especially when the rivet 44 is made of a metal or other material. The tubular portion of insulating sheet facilitates insulation of rivet 44.

REFERENCE MARKS IN THE DRAWINGS 1 electricity storage module
2 electricity storage device
10 outer can
12 opening
12a long side
14 sealing plate
16 output terminal
18 long-side surface
24 electrode body
26 current collector
28 electrode body holder
34 collector tab
38 flat plate
40 bottom plate
42 fixing mechanism
44 rivet
46 first through-hole
48 second through-hole
54 wall
56 recess
58 projection

The invention claimed is:
1. An electricity storage device comprising:
an outer can having an opening;
an electrode body having a pair of electrode plates and housed in the outer can;
a sealing plate that closes the opening with a sealing surface of the sealing plate;

a pair of output terminals arranged on the sealing plate in a first direction that is a longitudinal direction of the sealing plate;

a pair of current collectors by which the pair of electrode plates of the electrode body is electrically connected to the pair of output terminals respectively through respective collector plates;

an electrode body holder that is housed in the outer can and has an insulating property; and a pair of fixing mechanisms that are arranged outside the pair of output terminals in the first direction respectively and fix the electrode body holder to the sealing plate, wherein:

each of the electrode plates has a collector tab having a band-shape that extends from its corresponding electrode plate while curving on a side of the opening of the outer can, each of the current collectors is configured by the collector tab and the collector plate that are physically contacted to each other, the electrode body holder includes:
a flat plate extending in a second direction perpendicular to the sealing plate with one side of the flat plate being in parallel to the first direction; and
a pair of first fixing parts protruding in the second direction toward the sealing plate from both ends of the flat plate in the first direction, the sealing plate includes:
a pair of second fixing parts protruding in the second direction toward the pair of first fixing parts from both outside parts being located outside the pair of output terminals in the first direction on the sealing surface respectively, each of the pair of fixing mechanisms is configured to include one of the pair of the first fixing parts and one of the pair of the second fixing parts that are directly contacted to each other, and the collector tabs are arranged between the pair of fixing mechanisms.

2. The electricity storage device according to claim 1, wherein
the electrode body holder further includes a bottom plate that extends in the second direction, from an end of the flat plate opposite the sealing plate side.

3. The electricity storage device according to claim 1, wherein
the flat plate is disposed between the electrode body and the outer can or inside the electrode body.

4. The electricity storage device according to claim 1, wherein
the electrode body holder further includes a wall that extends in a third direction, which is perpendicular to the first and second directions.

5. The electricity storage device according to claim 1, wherein
the electrode body is bonded and fixed to the flat plate.

6. The electricity storage device according to claim 1, wherein
each of the fixing mechanisms includes a recess and a projection to be press-fitted into the recess,
the pair of the first fixing parts of the electrode body holder includes one of the recess and the projection, and
the pair of the second fixing parts of the sealing plate includes the other of the recess and the projection.

7. The electricity storage device according to claim 1, wherein
each of the fixing mechanisms includes a rivet or a screw, a first through-hole, and a second through-hole, the rivet or the screw to be inserted into and passed through the first through-hole and the second through-hole,
the pair of the first fixing parts of the electrode body holder includes the first through-hole, and
the pair of the second fixing parts of the sealing plate includes the second through-hole.

8. The electricity storage device according to claim 1, wherein
each of the fixing mechanisms includes an engaging groove and an engaging claw to be joined together in a snap-fit manner,
the pair of the first fixing parts of the electrode body holder includes one of the engaging groove and the engaging claw, and the pair of the second fixing parts of the sealing plate includes the other of the engaging groove and the engaging claw.

9. An electricity storage module comprising an assembly of a plurality of electricity storage devices each being the electricity storage device according to claim 1.

* * * * *